United States Patent [19]

Bloembergen et al.

[11] 4,425,440

[45] Jan. 10, 1984

[54] FLAME RETARDANT THERMALLY INSULATING MATERIAL

[75] Inventors: Roel Bloembergen; Jan A. Verhave, both of Amsterdam, Netherlands

[73] Assignee: Shell Oil Company, Houston, Tex.

[21] Appl. No.: 414,547

[22] Filed: Sep. 3, 1982

[30] Foreign Application Priority Data

Sep. 11, 1981 [GB] United Kingdom ................ 8127530

[51] Int. Cl.$^3$ ............................................. C08J 9/22
[52] U.S. Cl. ...................................... 521/54; 521/78; 521/79; 521/80; 521/81; 523/218
[58] Field of Search ........................ 521/54; 523/218

[56] References Cited

U.S. PATENT DOCUMENTS 3,764,357 10/1973 Bowles et al. ...................... 106/90
4,331,726 5/1982 Cleary ................................. 521/54

FOREIGN PATENT DOCUMENTS 1227649 10/1966 Fed. Rep. of Germany .
1602381 11/1981 United Kingdom .

*Primary Examiner*—Morton Foelak
*Attorney, Agent, or Firm*—Dean F. Vance; Peter A. Bielinski

[57] ABSTRACT

The invention provides a flame retardant thermally insulating material which comprises cellular polymer particles and fly ash bound into a coherent mass by a dried synthetic polymer latex binder, and a process for providing between at least two spaced-apart surfaces a flame retardant thermal insulation in the form of such a material. The process has particularly useful application in the field of roof insulation in sloping roofs having spaced-apart outer and inner layers.

10 Claims, No Drawings

FLAME RETARDANT THERMALLY INSULATING MATERIAL

BACKGROUND OF THE INVENTION

1. Field of the Invention

This invention relates to flame retardant thermally insulating material and to a process for providing a flame retardant thermal insulation between at least two spaced-apart surfaces.

2. Description of the Prior Art

In the interests of energy conservation it has become common and desirable to insulate buildings in order to minimize heat loss. Various means are employed to achieve such insulation, and new buildings tend to incorporate some or all of them as an integral part of their design. Existing buildings which do not incorporate adequate thermal insulation in their original structure may be modified in various ways, e.g. by cladding walls and/or ceilings with sheets, blocks or tiles of thermally insulating material, by fitting double glazing in window apertures, by laying thermally insulating material in loft floors or by introducing insulation into wall or roof cavities.

The provision of insulation in a roof cavity between inner and outer layers of a sloping roof, e.g. between outer slates or tiles and sarking has generally been achieved hitherto by directing ureaformaldehyde foam into the roof cavity. Although this has resulted in the provision of adequate thermal insulation, the presence of formaldehyde, which is widely acknowledged to have undesirable toxicological properties, in the foam is a significant disadvantage.

It is known, e.g. from W. German Auslegeschrift No. 1,227,649, to form thermally insulating material from cellular polystyrene particles bound together using a synthetic polymer latex binder such as polyvinylacetate and its copolymers. British patent application No. 29873/77 and the corresponding Belgian Patent No. 868,747 discloses the use of such a material as a cavity wall insulation, wherein in order for the material to possess fire retardant properties as required by various laws and local regulations in different countries, an organic bromine-containing compound is incorporated as a flame retardant component in the material. Furthermore it is preferred that the polystyrene particles themselves contain an additive to render them self extinguishing.

Lightweight concretes are known in which expanded polystyrene particles are bound into a solid concrete matrix with cement, for example as described in U.S. Pat. No. 3,764,357. The concrete may if desired contain amounts of an aqueous emulsion of an organic binder, e.g. a copolymer of polyvinylacetate and vinylchloride, to assist in wetting of the expanded polystyrene particles and it may additionally contain less than 30% based on the weight of cement of fly ash (see column 5, lines 54 to 55 and column 7, lines 8 to 9 of U.S. Pat. No. 3,764,357) as a strengthening additive. Although such lightweight concretes are strong materials, since they are concretes they are rigid and relatively brittle materials compared with thermally insulating materials in which cellular polymer particles are bound together by a synthetic polymer latex binder.

SUMMARY OF THE INVENTION

It has now surprisingly been discovered that inclusion of fly ash in a thermally insulating material in which cellular polymer particles are bound together by a synthetic polymer latex binder can render the material flame retardant without the need to incorporate halogen-containing flame retardant additives. Fly ash may be relatively inexpensively obtained as a waste product, for example from coal fired electricity generating stations.

In its broadest aspect, the invention provides a flame retardant thermally insulating material which comprises cellular polymer particles and fly ash bound into a coherent mass by dried synthetic polymer latex binder.

DETAILED DESCRIPTION OF THE INVENTION

Blocks or sheets of the thermally insulating material may be formed by mixing expanded polymer particles, fly ash and synthetic polymer latex together, putting the resulting mixture into a mold and allowing it to set. Such a mixture could also be applied as a surface covering e.g. an outside rendering on vertical or horizontal surfaces, which after setting may be coated with a water impermeable surface material e.g. a paint. However, if it is desired to use the material as a cavity insulation, for example in buildings as a cavity wall insulation or a roof insulation in roofs having a cavity between outer tiles or slates and sarking, the simple three-component mixture of expanded polymer particles, fly ash and synthetic polymer latex is generally unsuitable since it is too thick. If the mixture is made dilute by addition of water, problems arise of separation of components both in transportation of the mixture from mixing vessel to cavity (e.g. through pipes by pumping) and in situ before setting and drying has occurred. These problems are overcome in a process which forms a more specific aspect of the invention.

According to a more specific aspect of the invention therefore, a process for providing a flame retardant thermal insulation between at least two spaced-apart surfaces having an air-filled cavity therebetween comprises introducing into the cavity a foamed mixture of a synthetic polymer latex binder, a coalescing agent, a thickening agent, a foam stabilizer, a foaming agent, fly ash and cellular polymer particles. The foamed mixture spontaneously sets and dries in the cavity to give thermally insulating material in accordance with the invention.

Particles of expanded polystyrene are particularly suitable for use as the cellular polymer particles in the material and the process of this invention, but other types of cellular, expanded polymers may also be used. As is well known expanded polystyrene particles are conveniently prepared from expandable particles manufactured in the form of beads or pearls by suspension or emulsion polymerization techniques, the expanding agent such as pentane being incorporated therein during or after polymerization. Upon heating of the expandable pearls or beads, "pre-expansion" occurs, yielding the expanded polystyrene particles suitable for use in the method of this invention. Pre-expansion, a well-known step in the art of cellular polystyrene, comprises steaming the expandable beads or pearls to give an expansion of some 20 to 30 times, or even 70 times, their original volume, and during cooling allowing air to penetrate into the individual cells to raise the internal pressure to atmospheric pressure. These expanded cellular polystyrene particles have a spherical shape, an apparent, bulk density of, e.g. 6–100 g/l and free-flowing properties.

The particle size of the particles is suitably in the range of 1–10 mm, more preferably 2–3 mm. Because the fly ash confers flame retardant properties on the thermally insulating material of the invention, it is not necessary to employ self-extinguishing grades of expanded polystyrene particles, although self-extinguishing grades of expanded polystyrene particles, which commonly contain brominated or chlorinated organic additives as flame retardant, may be used if desired.

The synthetic polymer latex binder is an aqueous colloidal suspension of particles of a polymer obtained by addition polymerization. Generally the colloidal suspension is stabilized by the presence of a suitable surface-active agent, and the most suitable polymers are those obtained by free-radical emulsion polymerization. Thus, suitable latices include those based on, for example, styrene-butadiene copolymers, acrylic copolymers, butadieneacrylonitrile polymers, vinylidene chloride copolymers, butyl rubber, isoprene or, preferably, polymers or copolymers of vinyl alkanoates, such as vinyl acetate or vinyl propionate. A preferred class of latices are based on vinylacetate homopolymers and copolymers, in particular on copolymers of vinyl acetate with higher vinyl esters or with vinyl chloride or ethylene. In this context the term "copolymers" is not restricted to polymers based on only two different monomer components, and in particular it includes terpolymers. It has been found that particularly satisfactory results are obtained if the latex is based on a copolymer of vinyl acetate and a vinyl ester of a carboxylic acid having 6 to 16, in particular 8 to 12, carbon atoms per molecule, such copolymers being available commercially under the trade mark "VeoVa". In the latter type of copolymers the weight ratio of vinyl acetate to higher vinyl ester may be from 10:90 to 85:15, preferably from 60:40 to 80:20. A copolymer of vinylacetate with "VeoVa 10" (TM) in monomer weight ratio 75:25 has been found to give very acceptable results. An antifungal agent should be present in the latex, and latex supplied by a commercial manufacturer will generally contain an antifungal agent. On toxicological grounds the inclusion of formaldehyde as antifungal agent should be avoided. Examples of suitable antifungal agents include 1,2-benzisothiazolin-3-one, dithio-2,2'-bis (benzmethylamide) and polyhexamethylene biguanide hydrochloride. Examples of commercially available synthetic polymer latex binders which are known to give good results in the process of the invention are those sold under the trade mark "Vinamul" e.g. "Vinamul 6975", "3552" and "3452" (all ex Vinyl Products).

The coalescing agent is selected from the group of compounds known as plasticisers in the polymer art. Examples of suitable compounds are phthalates (e.g. the dialkyl phthalates, such as dibutyl phthalate, dimethyl phthalate and dioctyl phthalate; dicyclohexyl phthalate and diphenylphthalate), paraffins, chlorinated paraffins, glycols, polyglycols, ethoxyethanol, polyethers and alkylisobutyrates. Other plasticisers may also be used as coalescing agents, as will be readily apparent to those skilled in the polymer art. Dibutyl phthalate has been found to give very acceptable results.

The thickening agent may be selected from any of those generally known and used in the paint industry for latex paints. Examples of suitable such thickening agents include hydroxymethylcellulose, aluminium trihydrate, bentonite, magnesium montmorillonite, silicates, kaolin, titanium chelates and organic zirconium complexes (e.g. the blends of organic zirconium compounds and ammonium acetate sold by Manchem Ltd., under the trade marks "ZIRCOMPLEX PA" and "ZIRCOMPLEX PN"). Hydroxymethylcellulose thickening agents such as that available ex Hercules under the trade mark "Natrosol 250 MR" have been found to be very suitable.

The class of compounds which may generally be described as optionally ethoxylated fatty acid alkanol amides are suitable for use as foam stabilizers. Fatty acid diethanol amides, e.g. coconut fatty acid diethanol amides, are examples of such compounds. The foam stabilizer sold by Lankro Chemicals Ltd., under the trade mark "ETHYLAN LD" has performed very satisfactorily as a foam stabilizer in the process of the invention.

The foaming agent may be an ionic or non-ionic surface-active agent. Examples of surface active agents include the sodium or calcium salts of polyacrylic acids and lignin sulphonic acids; the condensation products of fatty acids of aliphatic amines or amides containing at least 12 carbon atoms in the molecule with ethylene oxide and/or propylene oxide; fatty acid esters of glycerol, sorbitan, sucrose or pentaerythritol; condensates of these with ehtylene oxide and/or proplylene oxide; condensation products of fatty alcohol or alkyl phenols, for example p-octylphenol or p-octylcresol, with ethylene oxide and/or propylene oxide; sulphates or sulphonates of these condensation products; alkali or alkaline earth metal salts, preferably sodium salts, of sulphuric or sulphonic acid esters containing at least 10 carbon atoms in the molecule, for example sodium lauryl sulphate, sodium secondary alkyl sulphates, sodium salts of sulphonated castor oil, and sodium alkylaryl sulphonates such as sodium dodecylbenzene sulphonate; and polymers of ehtylene oxide and copolymers of ethylene oxide and propylene oxide. Specific examples of commercially available surface-active agents which may advantageously be employed as foaming agents in the process of the invention are the following agents sold by the Royal Dutch/Shell group of companies under the trade mark "TEEPOL":-"TEEPOL 610" (a blend of alkyl sulphates), "TEEPOL CH 31-CH 53" (mixtures of alkylarylsulphonates and alkylphenol-ethylene oxide condensates), "TEEPOL GC 56" (mixture of alkylarylsulphonates and alcohol ether sulphates), "TEEPOL PB" (a sodium sulphate of an ethoxylated $C_{9-11}$ aliphatic alkanol bearing an average 2.5 ethoxy groups); the agent sold under the designation "8023" by Tillman (sodium and magnesium salts of laurylsulphate); and the agent sold by Servo B.V. under the trade mark "SERVOXYL VLF 1168" (disodium alkylsulphosuccinamates).

In order to impart optimal flame-retardant properties to the thermally insulating material of the invention, it is important that the fly ash should be incorporated in sufficiently large amounts and should be of such a particle size distribution that it is evenly distributed through the material and substantially coats each of the cellular polymer particles. Good flame retardant properties in the thermally insulating material may be obtained when the particle size of the cellular polymer particles is in the range 2 to 3 mm by using fly ash in an amount in the range 550 to 720 parts by weight, perferably about 600 parts by weight, per 100 parts by weight of the cellular polymer particles. Fly ash wherein at least 70% by weight has a particle size less than 37.5 microns has been found to be very suitable for incorporation in the thermally insulating material of the invention.

Sufficient synthetic polymer latex binder must be used in order that the dried binder may be able to bind the cellular copolymer particles and the fly ash in a coherent mass. Smaller particle sizes of cellular polymer particles require greater quantities of binder than do larger particle sizes. In general, enough synthetic polymer latex binder should be used for there to be at least 50 parts by weight of binder solids content per 100 parts by weight of cellular polymer particles. The upper limit of synthetic polymer latex binder is set more by commercial rather than practical considerations, since the binder is a relatively expensive component of the thermally insulating material of the invention. In general, amounts of latex binder containing similar weights of slightly less of binder solids to the weight of cellular polymer particles have been found to give very satisfactory results. In a preferred thermally insulating material in accordance with the invention there are 90 to 100 parts by weight of binder solids per 100 parts by weight of cellular polymer particles.

In the process of the invention, depending on the binder solids content of the synthetic polymer latex binder, it may be necessary to include additional water in preparing the foamed mixture. In general it is preferred that in the process of the invention, when the particle size of the cellular polymer particles is in the range 2 to 3 mm for 100 parts by weight of cellular polymer particles, 550 to 720, preferably about 600, parts by weight of fly ash should be used. It is further preferred that amounts of synthetic polymer latex binder, coalescing agent, thickening agent, foam stabilizer and foaming agent are used to provide 90 to 100 parts by weight of binder solids, 3 to 8, preferably about 5, parts by weight of coalescing agent, 1.8 to 2.5, preferably about 2, parts by weight of thickening agent, 0.47 to 0.81, preferably about 0.68 parts by weight of foam stabilizer, and 3.1 to 5.4, preferably about 4.5, parts by weight of foaming agent, and the overall water content of the foamed mixture is in the range 100 to 300, preferably about 200 parts by weight, per 100 parts by weight of the cellular polymer particles.

In a preferred process according to the invention a liquid mixture containing the synthetic polymer latex binder, the coalescing agent, the thickening agent, the foam stabilizer and the foaming agent is aerated to produce a foam, the fly ash is then added with mixing and thereafter the cellular polymer particles are mixed in to form the foamed mixture. The liquid mixture is preferably aerated until the volume of the foam is about 80% of the volume of the cellular polymer particles before addition of the fly ash and the cellular polymer particles. The foamed mixture may conveniently be transported from a mixing vessel to the cavity by means of flexible pipes using a peristaltic pump.

The process of the invention has particularly advantageous application when cavity is a cavity between sloping outer and inner layers of a roof, e.g. between outer slates or tiles and sarking.

The invention will be further understood from the following illustrative example.

EXAMPLE I 1440 g of a synthetic polymer latex binder which is a copolymer of vinylacetate with "VeoVa 10" (TM) ("VeoVa 10" is the vinyl ester of a mixture of highly branched isomers of $C_{10}$ monocarboxylic acids, mainly of tertiary structure) in monomer weight ratio 75:25 containing 55% by weight polymer solids and 0.5 g of 1,2-benzisothiazolin-3-one (antifungal agent); 2280 g of water; 40 g of dibutyl phthalate (coalesing agent); 14.4 g hydroxymethylcellulose thickening agent ("Natrosol 250 MR" (TM) ex Hercules); and 4.35 g of a foam stabilizer sold under the trade mark "ETHYLAN LD" ex Landro Chemicals Ltd., were thoroughly mixed together. About 75 g of an aqueous solution of foaming agent (containing 33%w active matter) sold by the Royal Dutch/Shell group of companies under the trade mark "TEEPOL PB" was added to the mixture, and, after further thorough mixing the liquid was aerated to produce a foam until the volume of the mixture had reached at least 40 liters. 4800 g of fly ash (ex Provinciale Gelderse Electriciteitsmaatschappij, Holland) produced from Ruhr coal and having the following oxide content in parts by weight:

$SiO_2 = 47.1$
$Al_2O_3 = 22.2$
$Fe_2O_3 = 8.7$
$CaO = 3.4$
$MgO = 3.0$
$Na_2O = 1.0$
$K_2O = 3.9$
$TiO_2 = 0.7$
$SO_332\ 0.4$
$P_2O_5 = 0.4$ and the following size distribution:

| Particle size (microns) | % wt |
| --- | --- |
| >300 | 0.4 |
| 150–300 | 4.3 |
| 75–150 | 10.4 |
| 63–75 | 5.1 |
| 37.5–63 | 7.4 |
| <37.5 | 71.8 | was mixed into the foamed mixture. Thereafter, 800 g of expanded polystyrene beads (about 50 l) sold by the Royal Dutch/Shell group of companies under the trade mark "Styrocell R 551" having a density of 16 kg/$m^3$ and bead diameter of 2–3 mm was then mixed into the mixture.

The resulting intimate mixture was in the form of a foamed slurry which remained stable for at least 30 minutes and could be transported through pipes or hoses during that period. The foamed slurry was injected at 20° C. into a roof cavity formed between the sarking and tiles of a sloping house roof. The composition filled the roof cavity but did not flow out from between the roof cavity but did not flow out from between the roof tiles and the sarking, and it remained stable until it had set and dried within 24 hours to give a resilient low-density, thermally insulating material having good flame retardance and mechanical stability. The flame retardance exceeded the minimum requirements of Netherlands standard specification NEN 3892. Flame retardance measure in terms of limiting oxygen index was 29. Thermal conductivity was less than $50 \times 10^{-3}$ watts per meter Kelvin (W/m.K). Physical tests made on a sample of the set and dried composition exhibited the following properties:

Cross-breaking strength (N): 107
Flexural strength (kN/$m^2$): 268.5
Deflection (mm): 4.1
Flexural modulus (kN/$m^2$): 5433
Distortion %: 0.11 g

What is claimed is:

1. A thermally insulating material, suitable for injection into cavities, which comprises cellular polymer particles, fly ash, a synthetic polymer latex binder, a foaming agent, a foam stabilizer, a thickening agent and a coalescing agent.

2. A material according to claim 1 wherein the thickening agent is a hydroxymethyl cellulose.

3. A material according to claim 1 wherein the coalescing agent is a phthalate.

4. A process for providing a flame retardant thermal insulation between at least two spaced-apart surfaces having an air-filled cavity therebetween, which process comprises introducing into the cavity a foamed mixture of a synthetic polymer latex binder, a coalescing agent, a thickening agent, a foam stabilizer, a foaming agent, fly ash and cellular polymer particles.

5. The process according to claim 4, wherein the coalescing agent is a phthalate.

6. The process according to claim 4 or 5, wherein the thickening agent is a hydroxymethylcellulose thickening agent.

7. The process according to claim 4, wherein amounts of synthetic polymer latex binder, coalescing agent, thickening agent, foam stabilizer and foaming agent are used to provide 90 to 100 parts by weight of coalescing agent, 1.8 to 2.5 parts by weight of thickening agent, 0.47 to 0.81 parts by weight of foam stabilizer and 3.1 to 5.4 parts by weight of foaming agent per 100 parts by weight of foaming cellular polymer particles, and the overall water content of the foamed mixture is in the range of about 100 to 300 parts by weight.

8. The process according to claim 4 wherein a liquid mixture containing the synthetic polymer latex binder, the coalescing agent, the thickening agent, the foam stabilizer and the foaming agent is aerated to produce a foam, fly ash is then added with mixing and thereafter the cellular polymer particles are mixed in to form the foamed mixture.

9. The process accroding to claim 8, wherein the liquid mixture is aerated until the volume of the foam is about 80% of the volume of the cellular polymer particles.

10. The process according to claim 4, wherein the foamed mixture is introduced into a cavity between sloping outer and inner layers of a roof.

* * * * *